US010413927B2

(12) United States Patent
Lind

(10) Patent No.: US 10,413,927 B2
(45) Date of Patent: Sep. 17, 2019

(54) MULTI-DISPENSER PLURAL COMPONENT DISPENSING SYSTEM

(71) Applicant: Graco Minnesota Inc., Minneapolis, MN (US)

(72) Inventor: Robert J. Lind, Robbinsdale, MN (US)

(73) Assignee: Graco Minnesota Inc., Minneapolis, MN (US)

(*) Notice: Subject to any disclaimer, the term of this patent is extended or adjusted under 35 U.S.C. 154(b) by 149 days.

(21) Appl. No.: 15/585,793

(22) Filed: May 3, 2017

(65) Prior Publication Data

US 2017/0333859 A1  Nov. 23, 2017

Related U.S. Application Data

(60) Provisional application No. 62/337,978, filed on May 18, 2016.

(51) Int. Cl.
  *G05D 11/00* (2006.01)
  *B05B 12/14* (2006.01)
  (Continued)

(52) U.S. Cl.
  CPC ............ *B05B 12/14* (2013.01); *B05B 12/085* (2013.01); *B05B 12/1436* (2013.01);
  (Continued)

(58) Field of Classification Search
  CPC ..... B05B 12/087; B05B 12/1436; B05B 7/26; Y10T 137/2499; Y10T 137/2521; Y10T 137/2564
  (Continued)

(56) References Cited

U.S. PATENT DOCUMENTS 3,605,683 A * 9/1971 Wiggins .................... B05B 5/08
                                                                118/324
4,085,892 A   4/1978 Dalton
(Continued)

FOREIGN PATENT DOCUMENTS

JP       H10393 A       1/1998
KR    20130006867 A     1/2013
WO   WO2015010035 A1    1/2015

OTHER PUBLICATIONS

International Search Report and Written Opinion from PCT Application Serial No. PCT/US2017/030818, dated Aug. 8, 2017, 15 pages.
(Continued)

*Primary Examiner* — Robert K Arundale
(74) *Attorney, Agent, or Firm* — Kinney & Lange, P.A.

(57) ABSTRACT

A plural component dispensing system individually delivers separate material components to each of a plurality of proportioners. Each of the proportioners regulates volumetric flow of each of the separate material components to produce a target ratio of the separate material components associated with the proportioner. The target ratios associated with the plurality of proportioners can be the same or different target ratios. Each proportioner delivers the separate material components at the associated target ratio to one of a plurality of dispensing devices. Each dispensing device mixes the separate components received at the corresponding target ratio and delivers the components as a mixture.

19 Claims, 2 Drawing Sheets

(51) Int. Cl.
   *B29B 7/00* (2006.01)
   *B29B 7/60* (2006.01)
   *B29B 7/72* (2006.01)
   *G05D 11/13* (2006.01)
   *B05B 12/08* (2006.01)
   *B29B 7/30* (2006.01)

(52) U.S. Cl.
   CPC .......... *B05B 12/1472* (2013.01); *B29B 7/007* (2013.01); *B29B 7/603* (2013.01); *B29B 7/728* (2013.01); *G05D 11/132* (2013.01); *B29B 7/30* (2013.01); *Y10T 137/2499* (2015.04)

(58) Field of Classification Search
   USPC .............................................. 222/134, 145.5
   See application file for complete search history.

(56) References Cited

U.S. PATENT DOCUMENTS

| | | | |
|---|---|---|---|
| 4,964,732 A * | 10/1990 | Cadeo | B01F 15/00142 366/142 |
| 5,078,168 A | 1/1992 | Konieczynski | |
| 5,197,676 A | 3/1993 | Konieczynski et al. | |
| 5,271,569 A | 12/1993 | Konieczynski et al. | |
| 5,490,726 A * | 2/1996 | Davis | B01F 5/0656 137/100 |
| 6,050,498 A | 4/2000 | Minoura et al. | |
| 6,704,617 B2 | 3/2004 | Cherfane et al. | |
| 2005/0058016 A1 * | 3/2005 | Smith | G05D 11/132 366/152.1 |
| 2010/0089948 A1 * | 4/2010 | Ziesel | B67D 1/0021 222/129.4 |
| 2012/0168532 A1 | 7/2012 | Giles | |
| 2012/0187145 A1 | 7/2012 | Gould et al. | |
| 2016/0109888 A1 | 4/2016 | Bordwell et al. | |
| 2016/0146201 A1 * | 5/2016 | Van Keulen | F16N 7/32 222/333 |
| 2017/0333927 A1 * | 11/2017 | Ross | B05B 12/087 |

OTHER PUBLICATIONS

International Preliminary Report on Patentablility for PCT Application No. PCT/US2017/030818, dated Nov. 29, 2018, 11 pages.

* cited by examiner

MULTI-DISPENSER PLURAL COMPONENT DISPENSING SYSTEM

CROSS-REFERENCE TO RELATED APPLICATION(S)

This application claims priority from U.S. Provisional Application Ser. No. 62/337,978, filed May 18, 2016, and entitled MULTI-GUN PLURAL COMPONENT DISPENSING/SPRAYING, which is hereby incorporated by reference in its entirety.

BACKGROUND

This disclosure relates generally to plural component dispensing systems, and more particularly to the proportioning of multiple material components to achieve a target mixing ratio at multiple dispensing devices.

Material (e.g., fluid) proportioners include dispensing systems that receive separate inert material components, mix the components in a predetermined ratio, and then dispense the components as an activated compound. For example, material proportioners are often used to dispense epoxies and polyurethanes that solidify after mixing of a resin component and an activating material, which are individually inert. After mixing, an immediate chemical reaction begins that results in the cross-linking, curing, and solidification of the mixture. Therefore, the two components are routed separately into the proportioner so that they can remain segregated as long as possible. A dispensing device, such as a sprayer or other device, receives each component after it is pumped separately and mixes the components for delivery as an activated compound.

A typical proportioner includes positive displacement pumps that individually draw in material from separate sources and pump pressurized materials (e.g., fluids) to the dispensing device for mixing and application. The pumps are often driven in synchronicity by a common motor, typically an air motor, electric motor/drive, or hydraulic motor, having a reciprocating drive shaft. In multi-dispenser applications, a separate set of pumps is typically utilized (i.e., one for each material component) and regulated to achieve the target ratio at each of the multiple dispensers, thereby increasing the cost and space required to implement the multi-dispenser applications.

SUMMARY

In one example, a system includes a first pump for delivering a first fluid component, a second pump for delivering a second fluid component, a first proportioner, a second proportioner, a first dispensing device, and a second dispensing device. The first proportioner is connected to each of the first and second pumps to regulate a volumetric flow of each of the first and second fluid components to produce a first target ratio of the first and second fluid components. The second proportioner is connected to each of the first and second pumps to regulate the volumetric flow of each of the first and second fluid components to produce a second target ratio of the first and second fluid components. The first dispensing device is connected to the first proportioner for receiving the first target ratio of the first and second fluid components. The second dispensing device is connected to the second proportioner for receiving the second target ratio of the first and second fluid components.

In another example, a method includes individually pumping a first fluid component and a second fluid component to each of a first proportioner and a second proportioner. The method further includes regulating volumetric flow of the first fluid component and the second fluid component through the first proportioner to produce a first target ratio of the first fluid component and the second fluid component, and regulating volumetric flow of the first fluid component and the second fluid component through the second proportioner to produce a second target ratio of the first fluid component and the second fluid component. The method further includes delivering the first target ratio of the first fluid component and the second fluid component from the first proportioner to a first dispensing device, and delivering the second target ratio of the first fluid component and the second fluid component from the second proportioner to a second dispensing device.

In another example, a system includes a plurality of pumps, each pump for delivering a separate fluid component, a plurality of proportioners, a control system, and a plurality of dispensing devices. Each of the plurality of proportioners includes a plurality of fluid regulators and a plurality of flow meters. Each fluid regulator is connected to one of the pumps for regulating fluid pressure of one of the fluid components. Each flow meter is configured to measure flow rate of one of the fluid components. The control system controls the fluid regulators of each of the plurality of proportioners based on the sensed flow rates of the respective proportioner to cause the respective proportioner to deliver the separate fluid components at a target ratio associated with the respective proportioner. Each of the plurality of dispensing devices is connected to one of the plurality of proportioners to receive the separate fluid components at the target ratio associated with the respective proportioner.

DETAILED DESCRIPTION

As described herein, a plural component dispensing system delivers multiple material components for mixing and application through multiple dispensing devices utilizing one pump per component. That is, rather than utilize a separate set of pumps for each dispensing device (e.g., spray applicator or other dispensing device), a system implementing techniques of this disclosure utilizes one pump per material component to deliver each of the multiple material components (e.g., fluids) to each of the multiple dispensing devices. Each pump is connected to deliver a separate material component to each of a set of multiple proportioners. Each of the proportioners regulates volumetric flow of each of the multiple material components to produce a target ratio of the separate material components that is delivered to one of the dispensing devices. Each proportioner can deliver a same or different target ratio of the separate material components to the respective dispensing device. The separate material components are mixed at the dispensing device and delivered as an activated compound. As such, a system implementing techniques of this disclosure can support operation of multiple dispensing devices to mix and deliver the separate material components at one or more target ratios utilizing one pump per material component, thereby reducing the cost, complexity, and overall maintenance of the system.

Figure 1:
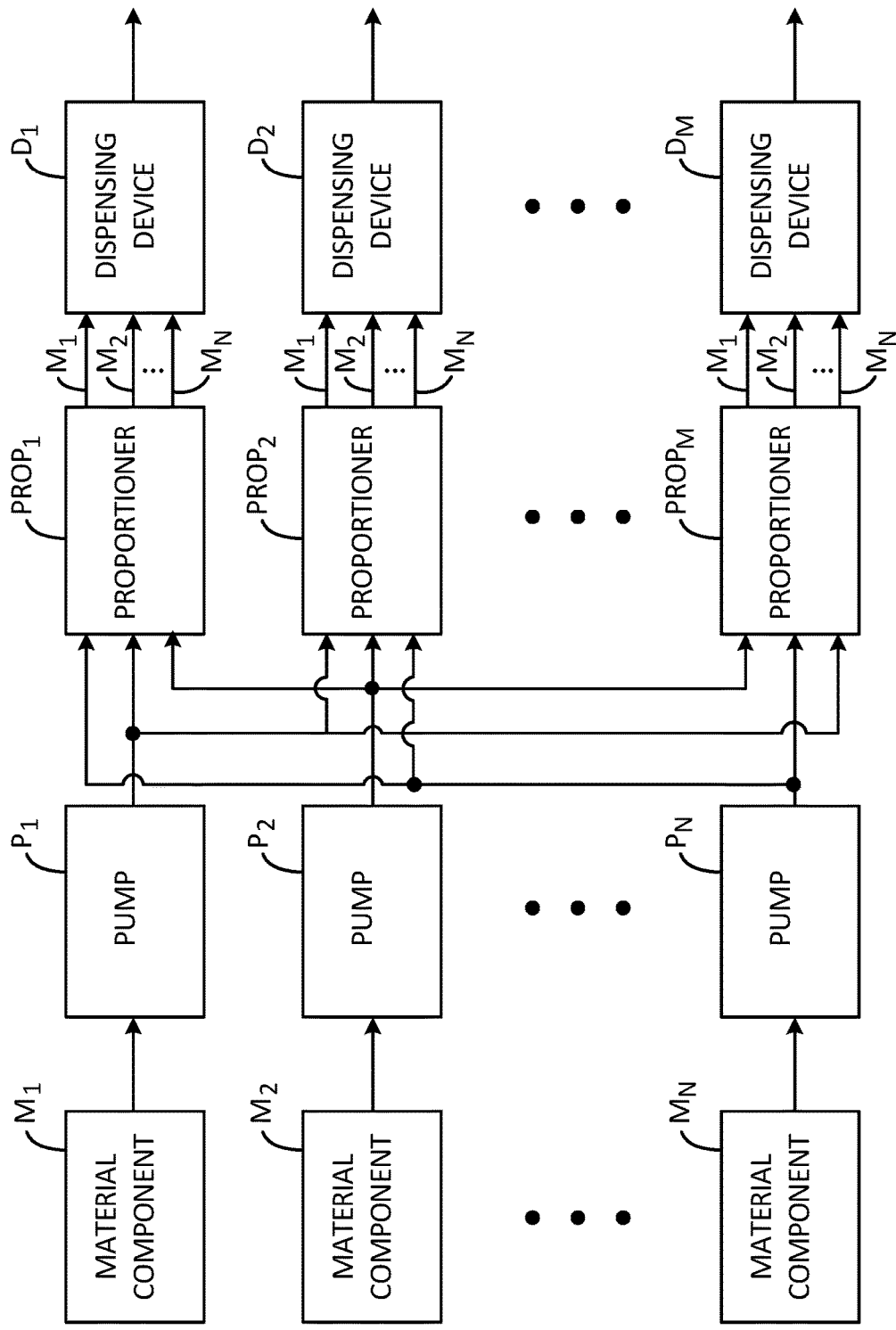
FIG. 1 is a block diagram of an example multi-dispenser plural component proportioning system including multiple proportioners that deliver separate material components to each of the multiple dispensing devices.

FIG. 1 is a block diagram of multi-dispenser plural component proportioning system 10 which can be used, for example, in a multi-component spray system. As illustrated in FIG. 1, system 10 includes material components $M_1$-$M_N$, pumps $P_1$-$P_N$, proportioners $PROP_1$-$PROP_M$, and dispensing devices $D_1$-$D_M$. Though illustrated and described as including "N" material components $M_1$-$M_N$ and "N" pumps $P_1$-$P_N$, as well as "M" proportioners $PROP_1$-$PROP_M$ and "M" dispensing devices $D_1$-$D_M$, it should be understood that "N" and "M" as used herein represent arbitrary numbers, such that system 10 can include any number of material components, pumps, proportioners, and dispensing devices. In addition, the letters "N" and "M" should not be construed to require any particular relativity of the represented numbers, such that "N" can represent a number that is greater than, equal to, or less than the number represented by the letter "M."

Material components $M_1$-$M_N$ are each individual components (e.g., fluid components) that, when mixed, trigger an immediate chemical reaction to form an activated compound, such as an epoxy, a polyurethane, or other activated compound. One or more of material components $M_1$-$M_N$ are referred to as a base component, and one or more of material components $M_1$-$M_N$ are referred to as a catalyst component.

Pumps $P_1$-$P_N$ are positive displacement or other types of pumps configured to deliver a corresponding one of material components $M_1$-$M_N$ (e.g., fluid components) to each of proportioners $PROP_1$-$PROP_M$ at pressures (e.g., 5000 psi) that are substantially greater the pressures at which they will be dispensed (e.g., 2000 psi). Pumps $P_1$-$P_N$ can, in certain examples, draw material components $M_1$-$M_N$ directly from material containers and deliver the individual components to each of proportioners $PROP_1$-$PROP_M$. In other examples, pumps $P_1$-$P_N$ can receive material components $M_1$-$M_N$ from separate pumps or other pressurized sources at a first pressure and deliver the material components to each of proportioners $PROP_1$-$PROP_M$ at a second pressure that is higher than the first pressure. Each of proportioners $PROP_1$-$PROP_M$ is connected to receive each of material components $M_1$-$M_N$ from each of pumps $P_1$-$P_N$ and regulate the volumetric flow of each of material components $M_1$-$M_N$ to produce a target ratio of material components $M_1$-$M_N$ that is delivered to a corresponding one of dispensing devices $D_1$-$D_M$. For instance, as is further described below, each of proportioners $PROP_1$-$PROP_M$ can include regulators, flow meters, and actuators configured to regulate the volumetric flow of material components $M_1$-$M_N$ via an electronic control system to produce a target ratio of material components $M_1$-$M_N$ delivered to the corresponding one of dispensing devices $D_1$-$D_M$. In other examples, any one or more of proportioners $PROP_1$-$PROP_M$ can be mechanically configured to passively regulate the volumetric flow of each of material components $M_1$-$M_N$ (e.g., without automatic electronic regulation) to produce the target ratio of material components $M_1$-$M_N$, such as the passive flow synchronizer described in the currently co-pending application PCT/US2016/044046, entitled "PASSIVE FLOW SYNCHRONIZER," filed on Jul. 26, 2016 and published under number WO 2017/019688, the entire contents of which are hereby incorporated by reference.

As illustrated in FIG. 1, each of dispensing devices $D_1$-$D_M$ are sprayer devices or other dispensing devices connected to receive each of material components $M_1$-$M_N$ from a corresponding one of proportioners $PROP_1$-$PROP_M$.

Each of dispensing devices $D_1$-$D_M$ receives material components $M_1$-$M_N$ at a target ratio from the corresponding one of proportioners $PROP_1$-$PROP_M$ and mixes the material components for dispensing as an activated compound. That is, each of dispensing devices $D_1$-$D_M$ includes a mixing device (e.g., a mixing manifold or other mixer) that mixes the received material components (i.e., received at the target ratio) for dispensing as the activated compound.

In operation, material components $M_1$-$M_N$ are individually pumped under pressure by pumps $P_1$-$P_N$ to each of proportioners $PROP_1$-$PROP_M$. Each of proportioners $PROP_1$-$PROP_M$ regulates the volumetric flow of each of material components $M_1$-$M_N$ to produce a target ratio of material components $M_1$-$M_N$ that are delivered to a corresponding one of dispensing devices $D_1$-$D_M$. For instance, as illustrated in the example of FIG. 1, material component $M_1$ is delivered by pump $P_1$ under pressure to each of proportioners $PROP_1$-$PROP_M$. Material component $M_2$ is delivered by pump $P_2$ to each of proportioners $PROP_1$-$PROP_M$, and material component $M_N$ is delivered by pump $P_N$ to each of proportioners $PROP_1$-$PROP_M$.

Proportioner $PROP_1$ regulates the volumetric flow of each of material components $M_1$-$M_N$ to produce a target ratio of material components $M_1$-$M_N$. Each of material components $M_1$-$M_N$ are individually delivered to dispensing device $D_1$ at the target ratio. Material components $M_1$-$M_N$ are mixed at dispensing device $D_1$ which, due to the mixing of the base component and the catalyst component, produces an immediate chemical reaction. The reacted mixture is delivered by dispensing device $D_1$ for application to, e.g., a target product. Similarly, each of proportioners $PROP_1$ and $PROP_M$ regulates the volumetric flow of each of material components $M_1$-$M_N$ to produce a target ratio of material components $M_1$-$M_N$. The target ratios of material components $M_1$-$M_N$ can be the same or different target ratios for each of proportioners $PROP_1$-$PROP_M$. Each of material components $M_1$-$M_N$ are individually delivered from proportioner $PROP_2$ to dispensing device $D_2$ at the target ratio corresponding to proportioner $PROP_2$. Each of material components $M_1$-$M_N$ are individually delivered from proportioner $PROP_M$ to dispensing device $D_M$ at the target ratio corresponding to proportioner $PROP_M$. Material components $M_1$-$M_N$ are mixed at each of dispensing device $D_2$ and $D_M$ to produce the immediate chemical reaction and delivery of the reacted mixture for application to a product, area, or other target. In some examples, any one or more of proportioners $PROP_1$-$PROP_M$ can control a total flow rate of material components $M_1$-$M_N$ (e.g., a sum of the combined flow rates of material components $M_1$-$M_N$) to a corresponding one of dispensing devices $D_1$-$D_M$, as is further described below.

Each of dispensing devices $D_1$-$D_M$ can therefore be utilized for individual application of the reacted mixture produced by the mixing of material components $M_1$-$M_N$. Dispensing devices $D_1$-$D_M$ can be physically remote from each other, separated by tens of feet, hundreds of feet, or other distances. Rather than require multiple sets of material component storage vessels and multiple sets of pumps (each individually regulated to produce the target ratio of material components $M_1$-$M_N$), system 10 utilizes a single pump per material component. Proportioners $PROP_1$-$PROP_M$ regulate the volumetric flow of each of material components $M_1$-$M_N$ to produce a target ratio of material components $M_1$-$M_N$ delivered to each of dispensing devices $D_1$-$D_M$. As such, system 10 implementing techniques described herein utilizes one pump per material component to achieve the target ratio of the material components at each of the multiple dispensing devices $D_1$-$D_M$, thereby reducing the complexity, cost, and overall maintenance requirements of the system.

Figure 2:
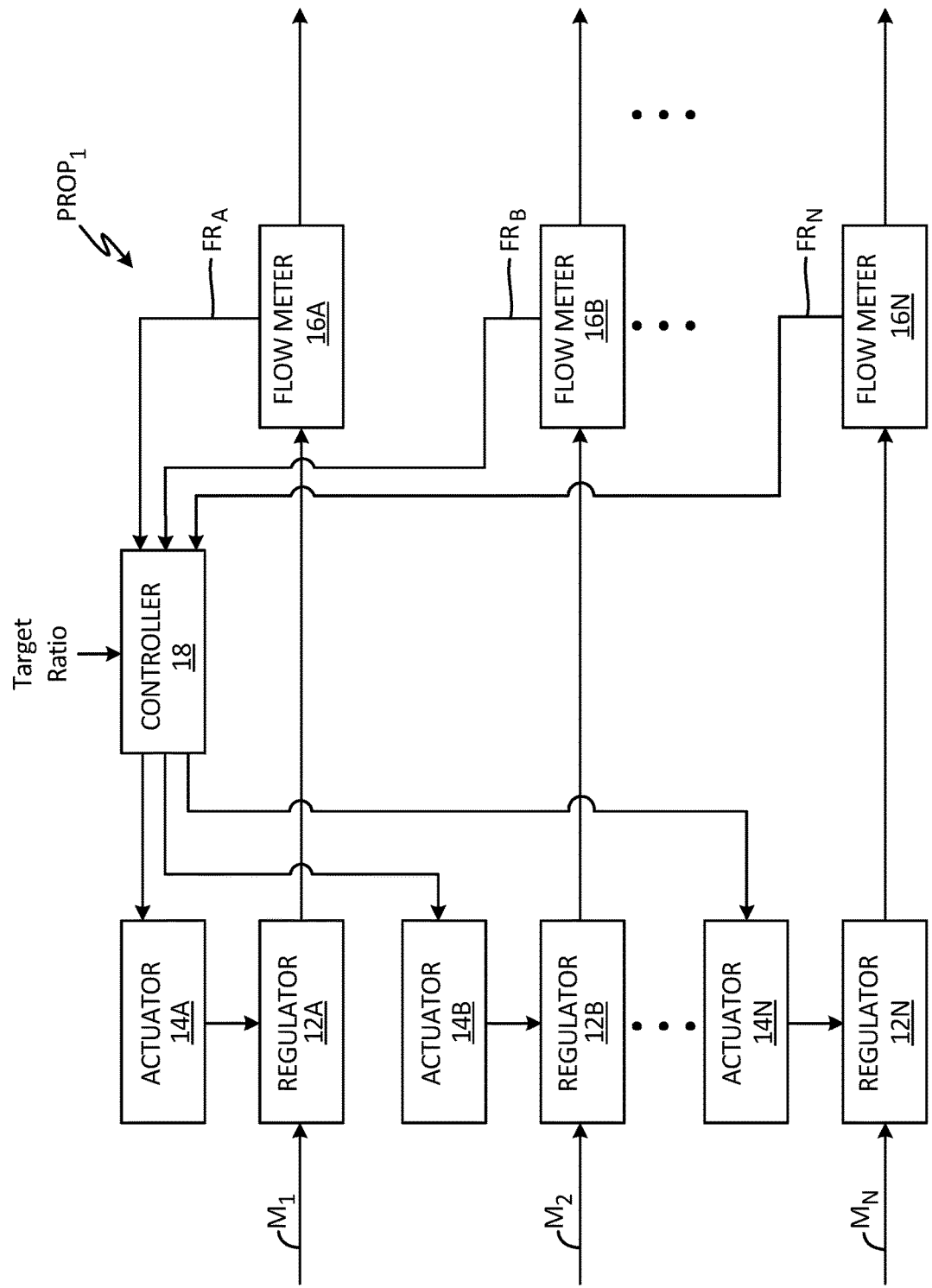
FIG. 2 is a block diagram illustrating further details of an example of one of the proportioners of FIG. 1.

FIG. 2 is a block diagram illustrating further details of one example of proportioner $PROP_1$ of FIG. 1. Though the example of FIG. 2 is described with respect to proportioner $PROP_1$, it should be understood that the techniques described below are applicable to any one or more of proportioners $PROP_1$-$PROP_M$ of FIG. 1.

As illustrated in FIG. 2, proportioner $PROP_1$ includes regulators 12A-12N, actuators 14A-14N, flow meters 16A-16N, and controller 18. Proportioner $PROP_1$ receives material components $M_1$-$M_N$ as inputs from pumps $P_1$-$P_N$ (FIG. 1) and provides material components $M_1$-$M_N$ individually at a target ratio as outputs to dispensing device $D_1$ (FIG. 1).

Regulators 12A-12N regulate fluid pressure (and hence the resulting volumetric flow) of material components $M_1$-$M_N$ in response to actuators 14A-14N. Regulators 12A-12N can be air controlled flow regulators, hydraulically controlled flow regulators, electrically driven motor controlled flow regulators, manually controlled flow regulators, or other types of flow regulators. For instance, in some examples, one or more of regulators 12A-12N regulate flow by controlling a variable orifice. A larger orifice provides less pressure drop, and a smaller orifice provides more pressure drop. In certain examples, one or more of regulators 12A-12N include an on/off valve, with flow through the valve being regulated by a length of time that the valve stays open.

Actuators 14A-14N control operation of regulators 12A-12N to regulate pressure (and resulting volumetric flow) of material components $M_1$-$M_N$. Actuators 14A-14N, in some examples, provide air pressure to regulators 12A-12N, respectively, to set the regulated pressure of material components $M_1$-$M_N$, respectively. In some embodiments, one or more of actuators 14A-14N are manually set air regulators, and others of actuators 14A-14N are electrically controlled via controller 18. In other embodiments, each of actuators 14A-14N are electrically controlled via controller 18.

Flow meters 16A-16N measure volumetric flow of material components $M_1$-$M_N$, respectively. Examples of flow meters 16A-16N include, e.g., gear meters, Coriolis mass flow meters, or other types of flow meters. Each of flow meters 16A-16N measures a volumetric flow rate of a respective one of material components $M_1$-$M_N$ as the material component passes through the respective flow meter and provides an indication of the measured flow rate to controller 18. That is, as illustrated in FIG. 2, flow meter 16A provides measured flow rate $FR_A$ to controller 18 indicating the measured volumetric flow rate of material component $M_1$ through regulator 12A and flow meter 16A. Flow meter 16B provides measured flow rate $FR_B$ to controller 18 indicating the measured volumetric flow rate of material component $M_2$, and flow meter 16N provides measured flow rate $FR_N$ to controller 18 indicating the measured volumetric flow rate of material component $M_N$.

Controller 18 is electrically and/or communicatively connected to receive the measured flow rates $FR_A$-$FR_N$ from flow meters 16A-16N. In addition, as illustrated in FIG. 2, controller 18 is electrically and/or communicatively connected to provide control commands to actuators $14_A$-$14_N$ based on the measured flow rates $FR_A$-$FR_N$ to control operation of regulators 12A-12N to produce the target ratio of material components $M_1$-$M_N$ individually delivered to dispensing device D1 (FIG. 1). Controller 18, in some examples, includes and/or presents a user interface (e.g., at a display device) configured to receive user input defining the target ratio associated with proportioner $PROP_1$. While illustrated as included with proportioner $PROP_1$, in other examples, controller 18 can be separate from proportioner $PROP_1$. For instance, in certain examples, controller 18 can be connected to each of proportioners $PROP_1$-$PROP_M$ and configured to provide control commands to actuators of each of proportioners $PROP_1$-$PROP_M$ to produce the target ratio of material components $M_1$-$M_N$ associated with the respective one of each of proportioners $PROP_1$-$PROP_M$.

Controller 18 includes one or more processors and computer-readable memory encoded with instructions that, when executed by the one or more processors, cause controller 18 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller 18 can be configured to store information within controller 18 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 18 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

Controller 18, in some examples, includes user interface components including one or more input devices (e.g., a keyboard, buttons, mouse, microphone, or other input devices) configured to receive input from a user and one or more output devices (e.g., a display device, indicator lights, or other output devices) configured to present information to a user. In some examples, controller 18 includes a touch-sensitive display configured to receive user input in the form of gestures (e.g., touch gestures, swipe gestures, pinch gestures, or other gestures) and to display information to the user.

In operation, material components $M_1$-$M_N$ are received by proportioner PROP under pressure from pumps $P_1$-$P_N$ (FIG. 1). Material components $M_1$-$M_N$ include one or more base material components and one or more catalyst material components. Often, the base material components are the major components of the resulting activated compound and are required at a higher concentration than the catalyst components. Controller 18 controls one or more of actuators 14A-14B which control operation of regulators 12A-12N to regulate the pressure of material components $M_1$-$M_N$ and the resulting volumetric flow of each. For example, controller 18 can implement a proportional integral derivative (PID) or other control algorithm to control operation of one or more of actuators 14A-14N to produce the target ratio of material components $M_1$-$M_N$ based on the measured feedback of flow rates $FR_A$-$FR_N$.

In some examples, one or more of actuators 14A-14N is manually controlled via operator input to produce a desired regulated fluid pressure at the output of the respective regulator. For instance, in one embodiment, actuator 14A is a manually controlled actuator and actuators 14B-14N are electrically controlled via commands from controller 18. In such an embodiment, an operator can manually set actuator 14A to produce a desired regulated fluid pressure at the output of regulator 12A. With that manually set fluid pressure, a flow rate of material component $M_1$ is established and measured by flow meter 16A. Actuators 14B-14N are controlled by controller 18 such that the flow rate of material components $M_2$-$M_N$ are scaled to the flow rate of material component $M_1$ and to each other to produce the target ratio of material components $M_1$-$M_N$ delivered to dispensing device $D_1$ for mixing and application of the reacted compound. In other examples, controller 18 controls each of actuators 14A-14N to produce the target ratio of components $M_1$-$M_N$ based on the measured volumetric flow rates $FR_A$-$FR_N$.

In some examples, controller 18 controls each of actuators 14A-14N to produce a total flow rate of material components $M_1$-$M_N$ delivered by proportioner $PROP_1$ to dispensing device $D_1$ (FIG. 1) at the target ratio. For instance, controller 18 can receive input (e.g., via a user interface) defining a total flow rate of material components $M_1$-$M_N$ to be delivered to dispensing device $D_1$. Controller 18 can control operation of actuators 14A-14N to produce the total target flow rate of each of material components $M_1$-$M_N$ delivered to dispensing device $D_1$ at the target ratio. For example, controller 18 can control a first one of actuators 14A-14N (e.g., actuator 14A) to cause the corresponding one of regulators 12A-12N (e.g., regulator 12A) to produce a first flow rate of the corresponding one of material components $M_1$-$M_N$ (e.g., material component $M_1$). Controller 18 can control each of the remaining ones of actuators 14A-14N (e.g., actuators 14B-14N) based on sensed flow rates $FR_A$-$FR_N$ to produce the target ratio of material components $M_1$-$M_N$ delivered to dispensing device $D_1$. Controller 18 can control each of actuators 14A-14N such that each of material components $M_1$-$M_N$ are delivered to dispensing device $D_1$ at the target ratio, and the sum of flow rates $FR_A$-$FR_N$ is the target total flow rate.

Accordingly, proportioner $PROP_1$ individually controls the regulated pressure and thus the flow rate of each of components $M_1$-$M_N$ to establish and maintain the target ratio of material components $M_1$-$M_N$ that are delivered to dispensing device $D_1$ (FIG. 1) for mixing and application. Proportioner $PROP_1$, in some examples, further controls the regulated pressure and corresponding flow rate of each of components $M_1$-$M_N$ to produce a target total flow rate of material components $M_1$-$M_N$ that are delivered to dispensing device $D_1$ at the target ratio. Moreover, techniques of this disclosure enable multiple dispensing devices to receive any one or more target ratios and target total flow rates of material components $M_1$-$M_N$ using one pump per material component, thereby reducing the cost, complexity, and overall maintenance of a multi-dispenser plural component dispensing system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising: a first pump for delivering a first material component; a second pump for delivering a second material component; a first proportioner connected to each of the first and second pumps to regulate a volumetric flow of each of the first and second material components to produce a first target ratio of the first and second material components; a second proportioner connected to each of the first and second pumps to regulate the volumetric flow of each of the first and second material components to produce a second target ratio of the first and second material components; a first dispensing device connected to the first proportioner for receiving the first target ratio of the first and second material components; and a second dispensing device connected to the second proportioner for receiving the second target ratio of the first and second material components; wherein each of the first proportioner and the second proportioner comprises: a first regulator connected to the first pump for regulating pressure of the first material component; a second regulator connected to the second pump for regulating pressure of the second material component; a first flow meter connected to measure a first volumetric flow rate of the first material component; and a second flow meter connected to measure a second volumetric flow rate of the second material component; and wherein the system further comprises a controller configured to control at least one of the first regulator and the second regulator of each of the first proportioner and the second proportioner based on the measured first volumetric flow rate and the measured second volumetric flow rate of the respective one of the first proportioner and the second proportioner.

2. The system of claim 1,
wherein each of the first proportioner and the second proportioner comprises:
a first actuator configured to control the first regulator of the respective one of the first proportioner and the second proportioner; and
a second actuator configured to control the second regulator of the respective one of the first proportioner and the second proportioner.

3. The system of claim 2,
wherein the controller is configured to control operation of at least one of the first actuator and the second actuator of each of the first proportioner and the second proportioner.

4. The system of claim 2,
wherein the controller is configured to control operation of each of the first actuator and the second actuator of each of the first proportioner and the second proportioner.

5. The system of claim 1,
wherein the controller comprises a user interface configured to receive user input defining the first target ratio and the second target ratio.

6. The system of claim 1,
wherein the dispensing device comprises a mixer configured to mix the first material component and the second material component.

7. The system of claim 1,
wherein the first material component comprises a base component; and
wherein the second material component comprises a catalyst component.

8. The system of claim 1,
wherein the first target ratio is different than the second target ratio.

9. A method comprising:
individually pumping a first material component and a second material component to each of a first proportioner and a second proportioner;
regulating volumetric flow, with a controller, of the first material component and the second material component through the first proportioner to produce a first target ratio of the first material component and the second material component;
regulating volumetric flow, with the controller, of the first material component and the second material component through the second proportioner to produce a second target ratio of the first material component and the second material component;
delivering the first target ratio of the first material component and the second material component from the first proportioner to a first dispensing device; and
delivering the second target ratio of the first material component and the second material component from the second proportioner to a second dispensing device.

10. The method of claim 9,
wherein regulating the volumetric flow of the first material component and the second material component through the first proportioner to produce the first target ratio comprises:
individually measuring flow rate of each of the first material component and the second material component through the first proportioner; and
individually regulating pressure of each of the first material component and the second material component based on the measured flow rates for each of the first material component and the second material component through the first proportioner to produce the first target ratio delivered to the first dispensing device; and
wherein regulating the volumetric flow of the first material component and the second material component through the second proportioner to produce the second target ratio comprises:
individually measuring flow rate of each of the first material component and the second material component through the second proportioner; and
individually regulating pressure of each of the first material component and the second material component based on the measured flow rates for each of the first material component and the second material component through the second proportioner to produce the second target ratio delivered to the second dispensing device.

11. The method of claim 9, further comprising:
receiving, at an interface device, user input defining the first target ratio and the second target ratio.

12. The method of claim 9,
wherein the first target ratio is different than the second target ratio.

13. The method of claim 9, further comprising:
mixing the first material component and the second material component at the first dispensing device to form a first mixture; and
mixing the first material component and the second material component at the second dispensing device to form a second mixture.

14. The method of claim 9,
wherein the first material component comprises a base material component; and
wherein the second material component comprises a catalyst material component.

15. A system comprising:
a plurality of pumps, each pump for delivering a separate material component;
a plurality of proportioners, each proportioner connected to each of the plurality of pumps, and each proportioner comprising:
a plurality of regulators, each regulator connected to one of the pumps for regulating pressure of one of the material components; and
a plurality of flow meters, each flow meter configured to measure flow rate of one of the material components;
a controller that controls the regulators of each of the plurality of proportioners based on the sensed flow rates of the respective proportioner to cause the respective proportioner to deliver the separate material components at a target ratio associated with the respective proportioner; and
a plurality of dispensing devices, each of the plurality of dispensing devices connected to one of the plurality of proportioners to receive the separate material components at the target ratio associated with the respective proportioner.

16. The system of claim 15,
wherein each of the plurality of proportioners includes a plurality of actuators, each actuator controlling one of the plurality of regulators of the respective proportioner; and
wherein the controller controls at least one of the actuators of each of the plurality of proportioners based on the target ratio of the separate material components associated with the respective proportioner.

17. The system of claim 15,
wherein each of the plurality of dispensing devices comprises a device for mixing the separate material components.

18. The system of claim 15,
wherein the separate material components include a base component and a catalyst component.

19. The system of claim 15,
wherein the controller further controls the regulators of each of the plurality of proportioners based on the sensed flow rates of the respective proportioner to cause the respective proportioner to deliver a target total flow rate of combined flow rates of each of the separate material components.

* * * * *